July 7, 1970  G. KRIKORIAN  3,519,292

DISCONNECTABLE JOINT STRUCTURE

Filed March 3, 1969

Inventor
GEORGE KRIKORIAN

By Charles R. Fay,
Attorney

United States Patent Office 3,519,292
Patented July 7, 1970

3,519,292
DISCONNECTABLE JOINT STRUCTURE
George Krikorian, 64 Main St., Spencer, Mass. 01562
Filed Mar. 3, 1969, Ser. No. 803,726
Int. Cl. E04g 7/00
U.S. Cl. 287—56                                    1 Claim

ABSTRACT OF THE DISCLOSURE

Joint structure for attaching a round tubing at right angles to a square tubing, including a small hole in one side of the square tubing with an opposite larger hole, the larger hole having the edges bent inwardly forming a reduced guide for the end of the round tubing, the latter having a nut secured therein and having a diameter slightly greater than the diameter of the hole with the edges bent in, and a screw in the smaller hole in the square tubing engaged with the nut and tightly drawing the same, i.e., end of the round tubing, against the side of the square tubing adjacent the smaller hole.

SUMMARY OF THE INVENTION

This invention provides a very tight, sturdy joint for round tubing with respect to a square tubing, the construction being such that it will not loosen or become detached. The round tubing is provided with a threaded member such as a nut in an end thereof and the square tubing has aligned holes in oppositely facing sides of the square tubing, one of said holes being smaller than the other and receiving a screw-threaded fastener, the other hole, the larger one, having the edges thereof bent inwardly and having a diameter less than the diameter of the round tubing so that the latter has to be forcibly jammed into the square tubing and thereby finds a very sturdy accurate means providing against any kind of lateral wobble.

PREFERRED EMBODIMENT OF THE INVENTION

Figure 1:
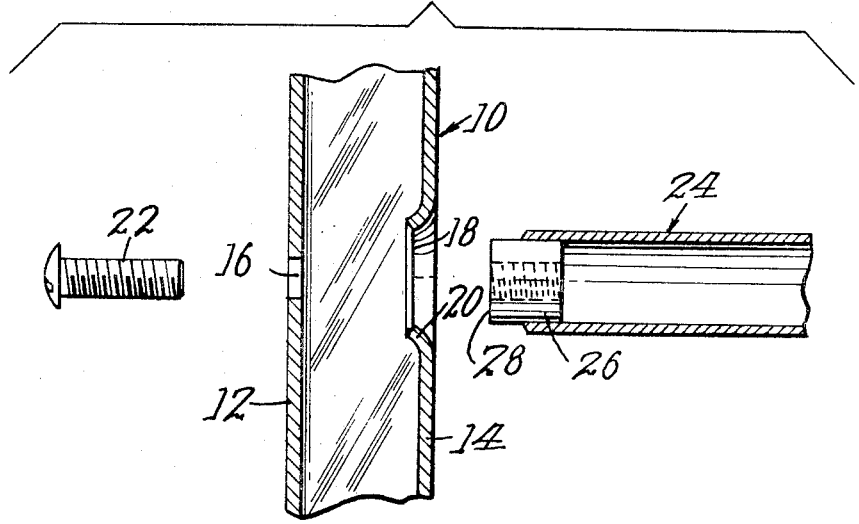
FIG. 1 is an exploded view illustrating the invention.

A square section tubing is generally indicated at 10. This tubing has the two opposite faces or side walls 12 and 14. The side wall 14 is provided with a relatively small hole 16 and the opposite side wall is provided with a larger hole at 18. These holes are axially aligned.

The smaller hole 16 is formed in any way desirable or convenient but the hole at 18 is punched in a special way so that the edges of this hole bend inwardly in a circle as at 20. This inward displacement of the material of the wall 14 of the square tube 10 is annular and the diameter thereof is greater than that of the diameter of the small hole at 16. The smaller hole receives a screw-threaded fastener 22.

A round tubing generally indicated at 24 is provided with an interiorly threaded nut or the like at 26 at an end thereof and the diameter of the tubing 24 is slightly greater than that of the diameter of the hole at 18.

It will be seen therefore that in assembling this joint the inturned annular edge 20 of the hole 18 acts as a guide for the leading end of the round tubing, and at the same time grips it tightly and is even further deformed by the action of thrusting the leading end of the round tube into hole 18.

Figure 2:
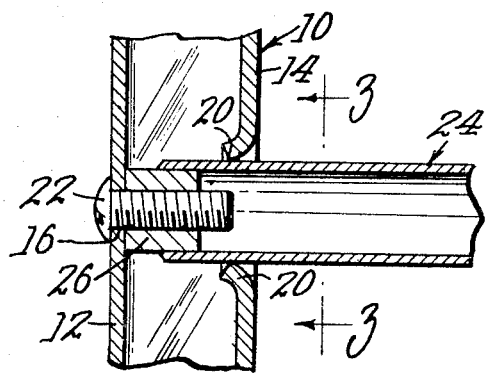
FIG. 2 is a similar view showing the parts assembled.
Figure 3:
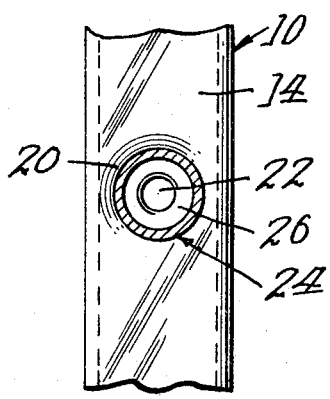
FIG. 3 is a section on line 3—3 of FIG. 2.

The threaded member 26 abuts the interior surface of wall 12 and the threaded member 22 upon being turned up then draws the leading end of the tubing into firm and very tight contact with the interior surface of the wall 12 as shown in FIG. 2.

By tightening the threaded member 22, the joint described is made extremely strong and without any possibility of wobble. The threaded member 26 of course has a flat face at 28 which firmly abuts the flat surface of wall 12 and the inturned annular edge 20 surrounding hole 18 firmly grips the round tubing all around the same so that the round tubing 24 is thereby held to the square tubing very firmly and with no possibility of loosening or accidental displacement.

Having thus described my invention and the advantages thereof, I do not wish to be limited to the details herein disclosed, otherwise than as set forth in the claim, but what I claim is:

1. Joint structure comprising a generally rectangular tubing including a pair of opposite flat walls, a hole in one wall, a larger hole in the opposite wall, said holes being generally circular and being coaxially aligned,
a generally round tubing, a flat-ended threaded plug member permanently attached within an end of the round tubing and projecting beyond it so as to extend outside of said round tubing, said round tubing entering through said larger hole and the flat end of the threaded plug member abutting the inner surface of the wall of the rectangular tubing radially outwardly about the smaller hole, a threaded fastener passing through said smaller hole and engaged with said threaded plug member drawing the same into tight engagement with the inner surface of the wall of the rectangular tubing with the smaller hole, wherein said larger hole has bent in edges forming an angular inwardly directed generally funnel-like guide having a diameter slightly less than the exterior diameter of the round tubing, whereby it not only guides the tubing into position but also tightly engages it against any possibility of lateral wobble.

References Cited

UNITED STATES PATENTS

| 2,575,965 | 11/1951 | Malm | 285—191 |
| 2,594,561 | 4/1952 | Huck | 285—192 XR |
| 2,876,740 | 3/1959 | Melas | 285—192 XR |
| 3,344,370 | 9/1967 | Sewell. | |
| 3,427,056 | 2/1969 | Cunningham. | |

FOREIGN PATENTS

| 1,067,330 | 1/1954 | France. |
| 1,122,019 | 5/1956 | France. |

DAVID J. WILLIAMOWSKY, Primary Examiner
A. V. KUNDRAT, Assistant Examiner